(12) United States Patent
Hall et al.

(45) Date of Patent:

(10) Patent No.: US 9,656,516 B2
May 23, 2017

(54) BICYCLE RIM

(75) Inventors: Michael Hall, Carmel, IN (US); Joshua Poertner, Carmel, IN (US)

(73) Assignee: SRAM, LLC, Chicago, IL (US)

( * ) Notice: Subject to any disclaimer, the term of this patent is extended or adjusted under 35 U.S.C. 154(b) by 414 days.

(21) Appl. No.: 12/775,473

(22) Filed: May 7, 2010

(65) Prior Publication Data

US 2011/0273000 A1    Nov. 10, 2011

(51) Int. Cl.
*B60B 1/04*    (2006.01)
*B60B 21/02*   (2006.01)
*B60B 5/02*    (2006.01)

(52) U.S. Cl.
CPC ............. *B60B 21/02* (2013.01); *B60B 1/043* (2013.01); *B60B 5/02* (2013.01); *B60B 21/025* (2013.01); *B60B 2360/341* (2013.01); *B60B 2900/1216* (2013.01)

(58) Field of Classification Search
CPC .. B60B 1/02; B60B 1/04; B60B 1/041; B60B 1/043; B60B 21/00; B60B 21/02; B60B 21/025; B60B 21/06
USPC ................. 301/58, 95.101–95.106
See application file for complete search history.

(56) References Cited

U.S. PATENT DOCUMENTS

| | | | | |
|---|---|---|---|---|
| 365,091 A | * | 6/1887 | Owen | 301/58 |
| 383,129 A | * | 5/1888 | Jeffery | 301/95.106 |
| 5,061,013 A | * | 10/1991 | Hed et al. | 301/64.704 |
| 5,975,645 A | * | 11/1999 | Sargent | 301/95.11 |
| 6,068,347 A | * | 5/2000 | Okajima et al. | 301/55 |
| 6,145,936 A | * | 11/2000 | Alberti et al. | 301/58 |
| 6,145,937 A | * | 11/2000 | Chen | 301/58 |
| 6,158,819 A | * | 12/2000 | Okajima et al. | 301/58 |
| 6,231,128 B1 | * | 5/2001 | Okajima et al. | 301/58 |
| 6,991,298 B2 | * | 1/2006 | Ording et al. | 301/30 |
| 8,342,614 B2 | * | 1/2013 | Poertner et al. | 301/95.107 |
| 2008/0174168 A1 | | 7/2008 | Yang | |

FOREIGN PATENT DOCUMENTS

| CN | 101554827 | 10/2009 |
|---|---|---|
| DE | 10136345 A1 | 2/2003 |
| WO | WO 97/18098 | 5/1997 |

* cited by examiner

*Primary Examiner* — Jason Bellinger
(74) *Attorney, Agent, or Firm* — Milan Milosevic; Lisa Serdynski

(57) ABSTRACT

A rim for a bicycle wheel that includes a tire, hub and spokes. The bicycle rim generally includes a radially outer tire-engaging portion, a radially inner spoke-engaging portion, a first sidewall and a second sidewall spaced apart from the first sidewall. The first and second sidewalls extend between the tire engaging and spoke-engaging portions. The tire-engaging and spoke-engaging portions and first and second sidewalls form a toroid. A maximum width of the rim is disposed closer to the spoke-engaging portion than the tire-engaging portion.

10 Claims, 7 Drawing Sheets

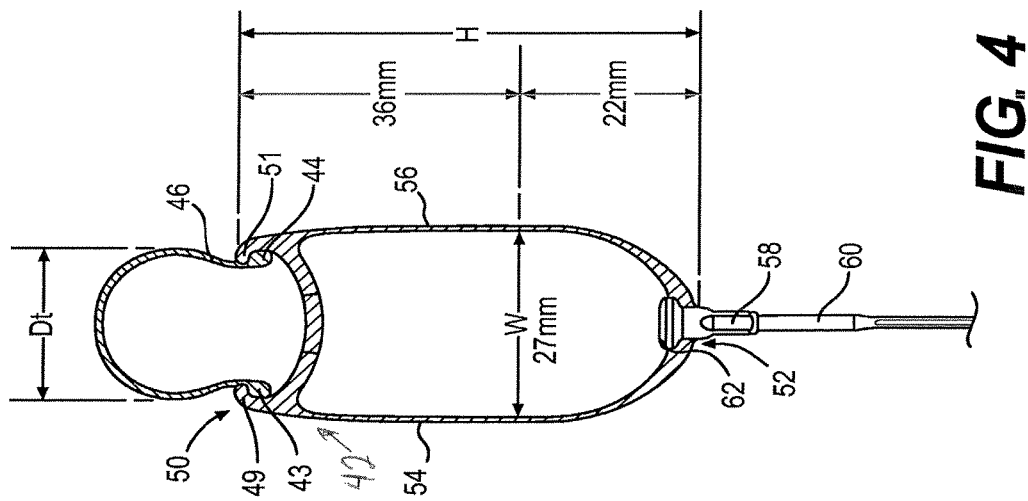
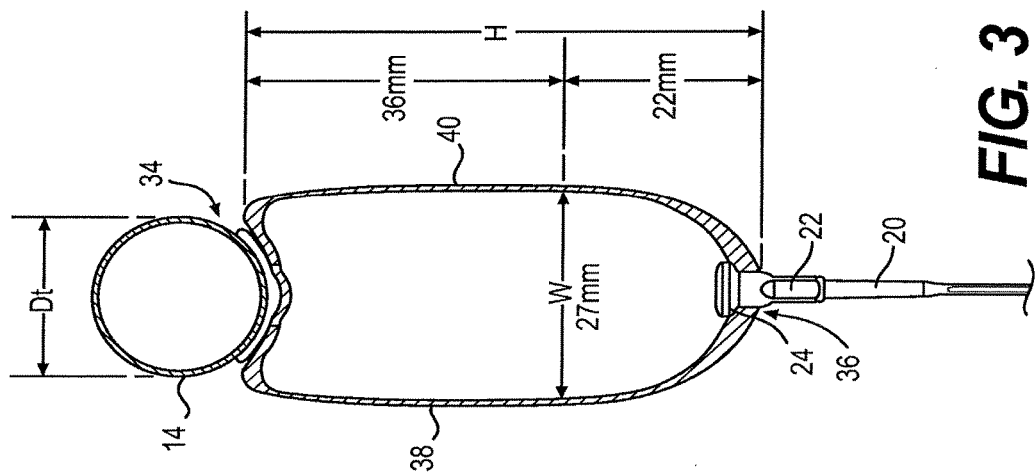

BICYCLE RIM

BACKGROUND OF THE INVENTION

The present invention relates to bicycle rims, and more particularly to a toroidal bicycle rim having a maximum width disposed closer to a spoke-engaging portion than a tire-engaging portion of the rim.

As a bicycle travels through the air, unwanted turbulence is generated around the bicycle wheel creating drag which acts against the bicycle's forward motion. Further, the bicycle's forward motion may be hindered by crosswinds causing the bicycle to lean.

SUMMARY OF THE INVENTION

The present invention provides a rim for a bicycle wheel having a tire, hub and spokes. The rim generally includes a radially outer tire-engaging portion, a radially inner spoke-engaging portion, a first sidewall and a second sidewall spaced apart from the first sidewall. The first and second sidewalls extend between the tire-engaging and spoke-engaging portions. The tire-engaging and spoke-engaging portions and the first and second sidewalls form a toroid. A maximum width of the rim is disposed closer to the spoke-engaging portion than the tire-engaging portion. In one embodiment of the present invention, the maximum width of the rim is greater than a tire diameter Dt and the height of the rim is greater than 40 mm or greater than 7% of a diameter of the rim. A transverse cross section formed by the rim and the tire mounted thereto is substantially elliptical. An aspect ratio of the rim ranges from 1.5 to 5. In one of the embodiments, the rim and tire include a side profile, the rim includes a steering axis and the transverse cross section positions the center of pressure on the side profile either below or rearward of the rim steering axis or both below and rearward of the rim steering axis.

These and other features and advantages of the present invention will be more fully understood from the following description of one or more embodiments of the invention, taken together with the accompanying drawings.

BRIEF DESCRIPTION OF THE DRAWINGS

In the drawings:

FIG. 3 is a cross-sectional view of a tubular rim, tire and a metal spoke;

FIG. 4 is a cross-sectional view of a clincher rim, tire and a metal spoke;

DETAILED DESCRIPTION

Figure 1:
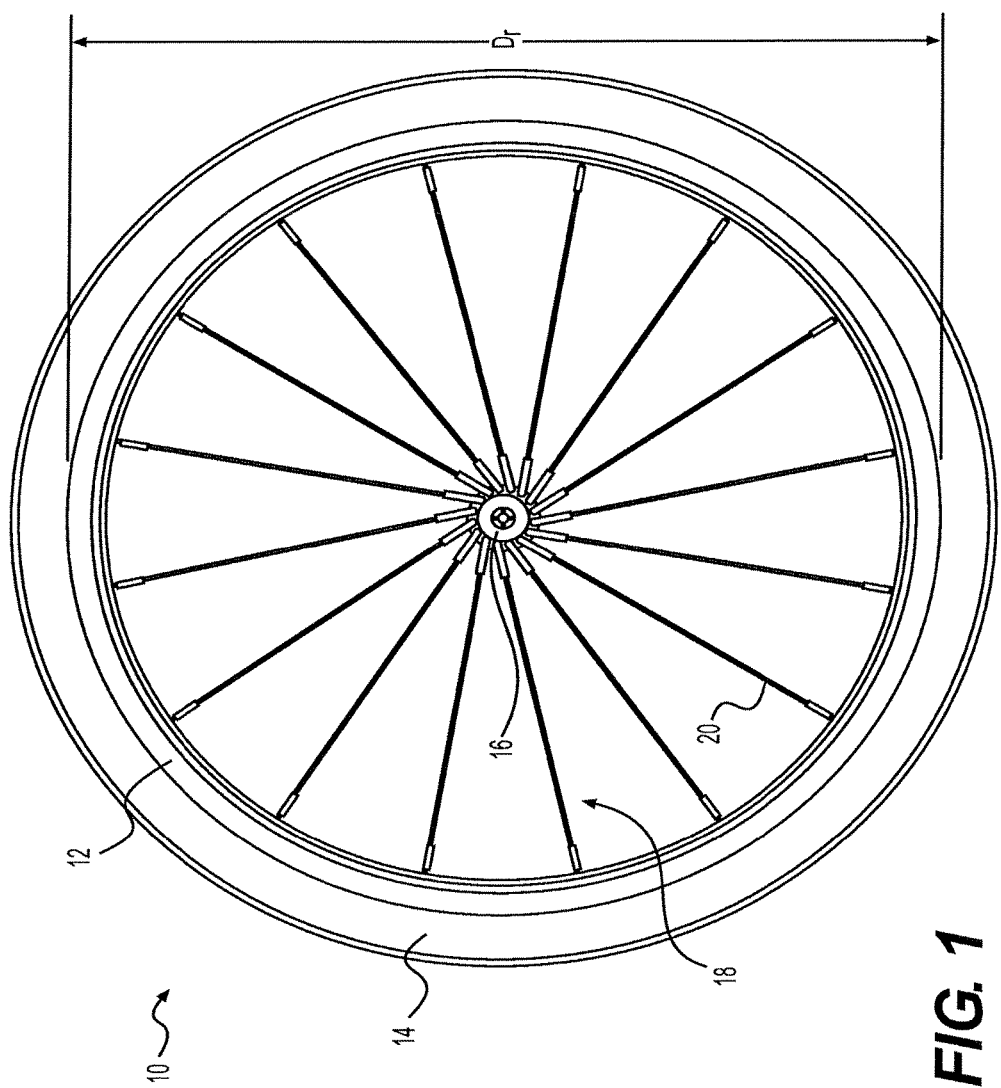
FIG. 1 is a side view of a metal-spoked bicycle wheel.
Figure 2:
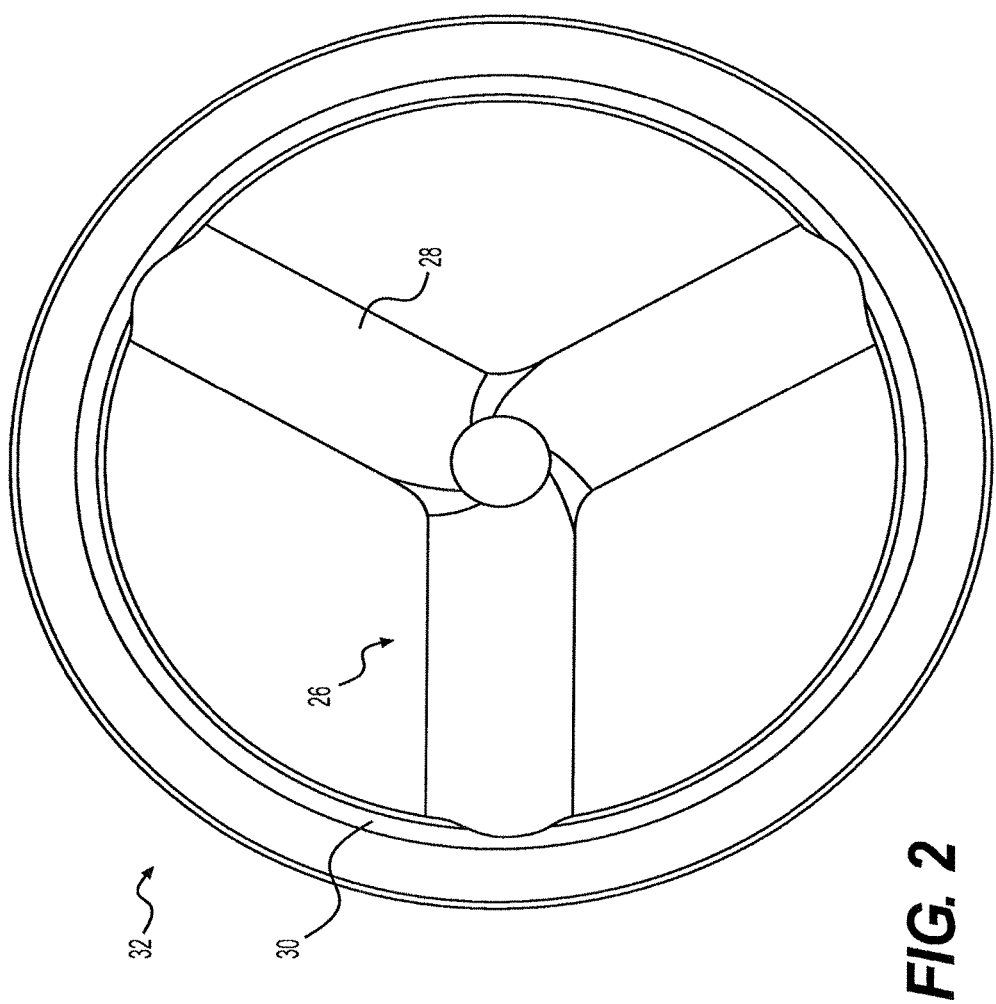
FIG. 2 is a side view of a three-spoked bicycle wheel.
Figure 5:
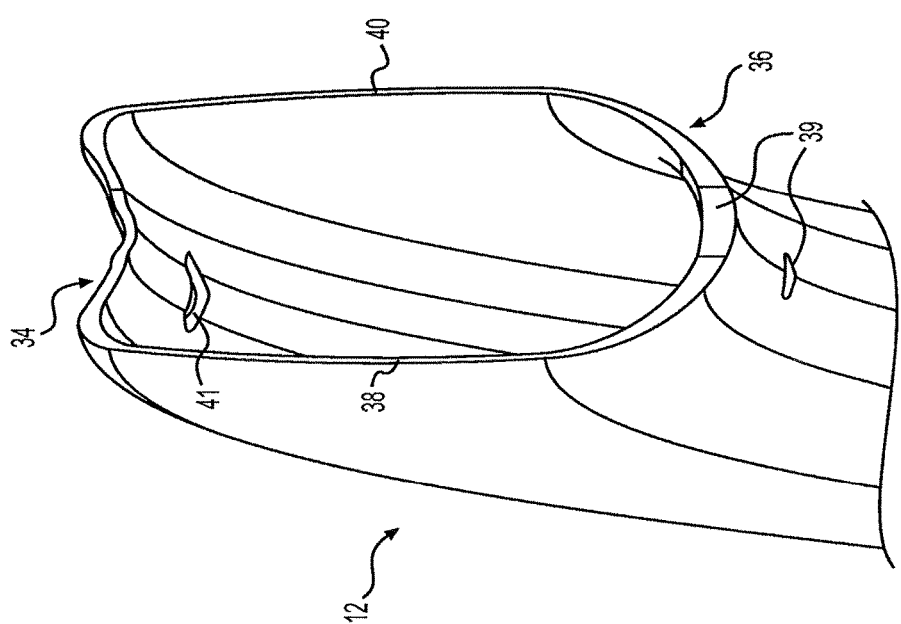
FIG. 5 is a perspective cross-sectional view of the tubular rim of FIG. 3.

FIGS. 1, 3 and 5 illustrate a bicycle wheel 10 including a toroidal rim 12, a tire 14, a hub 16 and a spoke system 18. The hub 16 is mounted to a frame of the bicycle (not shown). The spoke system 18 includes a plurality of metal spokes 20, typically about thirty-two to thirty-six spokes. Looking to FIG. 3, the spoke 20 includes a threaded end 22 and a nipple 24 to secure the spoke 20 to the rim 12. Alternatively, a spoke system 26 may include three composite spokes 28 molded into a rim 30 of a bicycle wheel 32 (see FIG. 2).

The wheel 10 shown in FIGS. 1, 3 and 5 is a tubular or sew-up type wheel wherein the tire 14 is glued to the rim 12. The rim 12 generally includes a radially outer tire-engaging portion 34, a radially inner spoke-engaging portion 36, a first sidewall 38 and a second sidewall 40 spaced apart from the first sidewall 38. The first and second sidewalls 38, 40 extend between the tire-engaging 34 and spoke-engaging portion 36. The tire 14 is glued to the tire-engaging portion 34 of the rim 12. The spoke-engaging portion 36 includes a plurality of first openings 39 for receiving the threaded ends 22 of the spokes 20 therethrough. The tire-engaging portion 34 includes a plurality of second openings 41 aligned with the plurality of first openings 39 for receiving a tool to tighten the nipples 24 on the threaded ends 22 of the spokes 20 to secure the spokes 20 to the rim 12. The tire-engaging and spoke-engaging portions 34, 36 and first and second sidewalls 38, 40 form a toroid.

Figure 6:
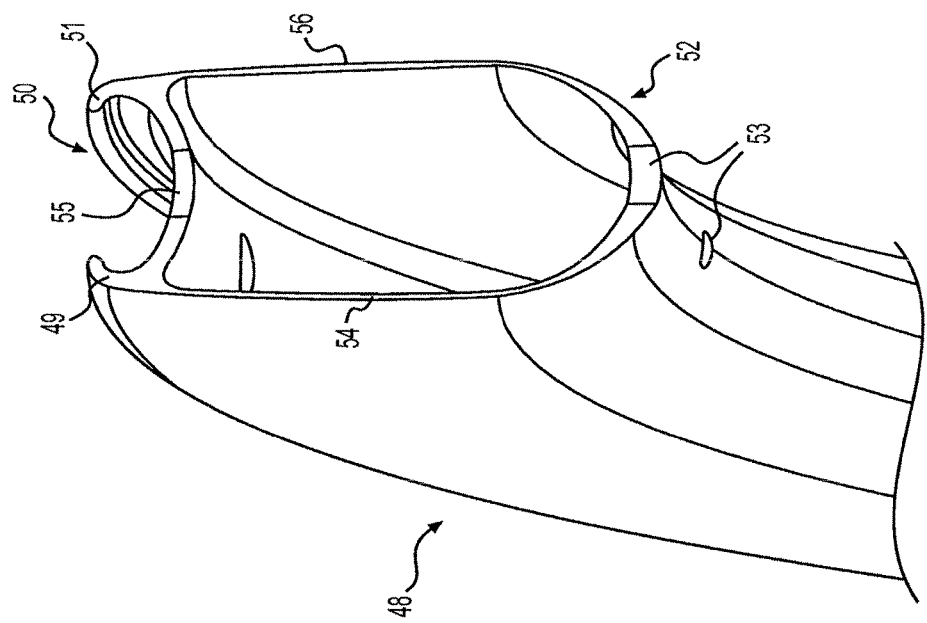
FIG. 6 is a perspective cross-sectional view of the clincher rim of FIG. 3.

Another type of wheel is shown in FIGS. 4 and 6, a clincher wheel 42, wherein beads 43, 44 of a tire 46 are clinched onto a rim 48. The rim 48 generally includes a radially outer tire-engaging portion 50, a radially inner spoke-engaging portion 52, a first sidewall 54 and a second sidewall 56 spaced apart from the first sidewall 54. The first and second sidewalls 56, 54 extend between the tire-engaging and spoke-engaging portion 50, 52. The tire-engaging portion 50 includes a pair of circumferential bead engaging members 49, 51 for engaging the beads 43, 44 of the tire 46. The spoke-engaging portion 52 includes a plurality of first openings 53 for receiving threaded ends 58 of spokes 60 therethrough. The tire-engaging portion 50 includes a plurality of second openings 55 aligned with the plurality of first openings 53 for receiving a tool to tighten nipples 62 on the threaded ends 58 of the spokes 60 to secure the spokes 60 to the rim 48. The tire-engaging and spoke-engaging portions 50, 52 and first and second sidewalls 54, 56 form a toroid.

As used herein, toroid or toroidal means a surface generated by a plane closed curve rotated about a line that lies in the same plane as the curve but does not intersect it. The plane closed curve of the toroid may take on any shape. Looking to FIGS. 5 and 6, the plane closed curve which generates the form of the toroidal rim 12 and 48, respectively, is substantially an ellipse which has been modified to provide a concave end at the tire-engaging portions 34, 50, respectively. Looking to FIGS. 3 and 4, the major and minor cross-sectional dimensions of the toroidal rims 12, 48 define an aspect ratio. The aspect ratios of the rims 12, 48 are the ratio of the rim heights H to the rim widths W. The rim height H is defined as the maximum vertical rim dimension when the rim is oriented perpendicular to a horizontal plane. The rim width W is the maximum horizontal dimension when the rim is oriented perpendicular to a horizontal plane. The toroidal rim and tire mounted thereto may form a substantially elliptical cross section and the rim has an aspect ratio ranging from 1.5 to 5. In the embodiments shown, the rims 12, 48 have a maximum height H of 58 mm and a maximum width W of 27 mm, thus forming an aspect ratio of 2.15. Preferably, the rim height H is greater than 40 mm or greater than 7% of the rim diameter Dr. To improve the aerodynamic efficiency, the ratio of the maximum rim width W to the tire diameter Dt is in the range from about 1.05 to about 1.25.

Figure 7:
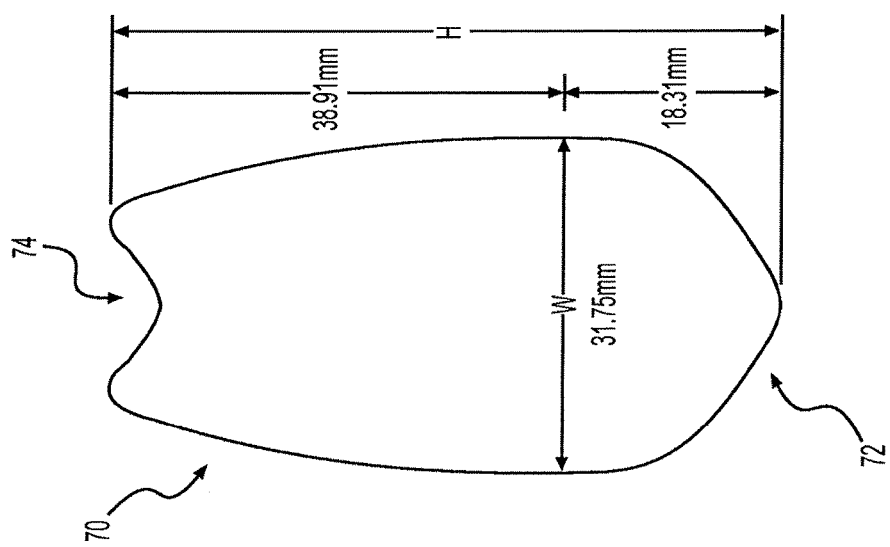
FIG. 7 is a schematic cross-sectional view of a rim according to another embodiment of the present invention.
Figure 8:
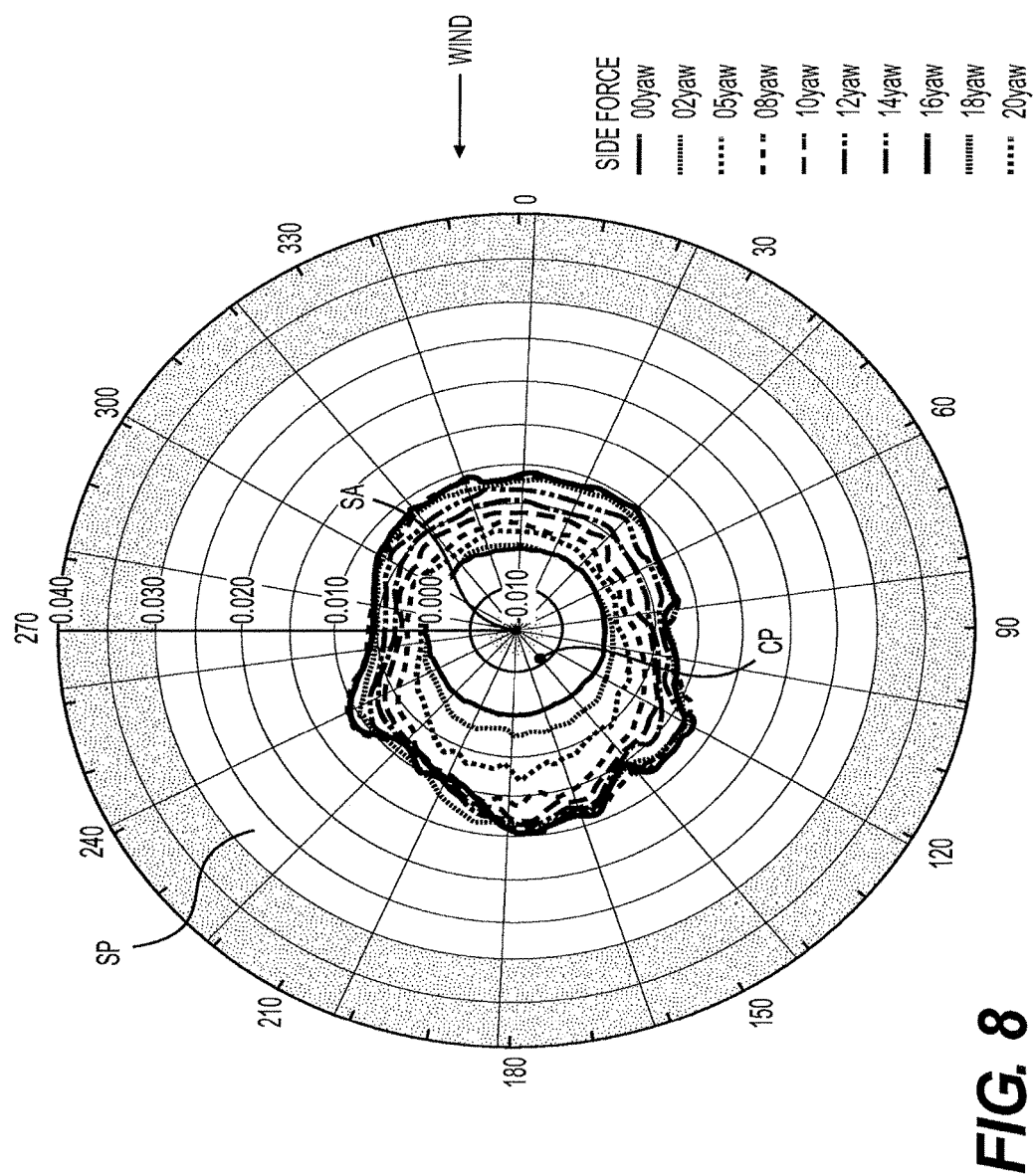
FIG. 8 is a CFD force diagram of a rim having a height of 58 mm.
Figure 9:
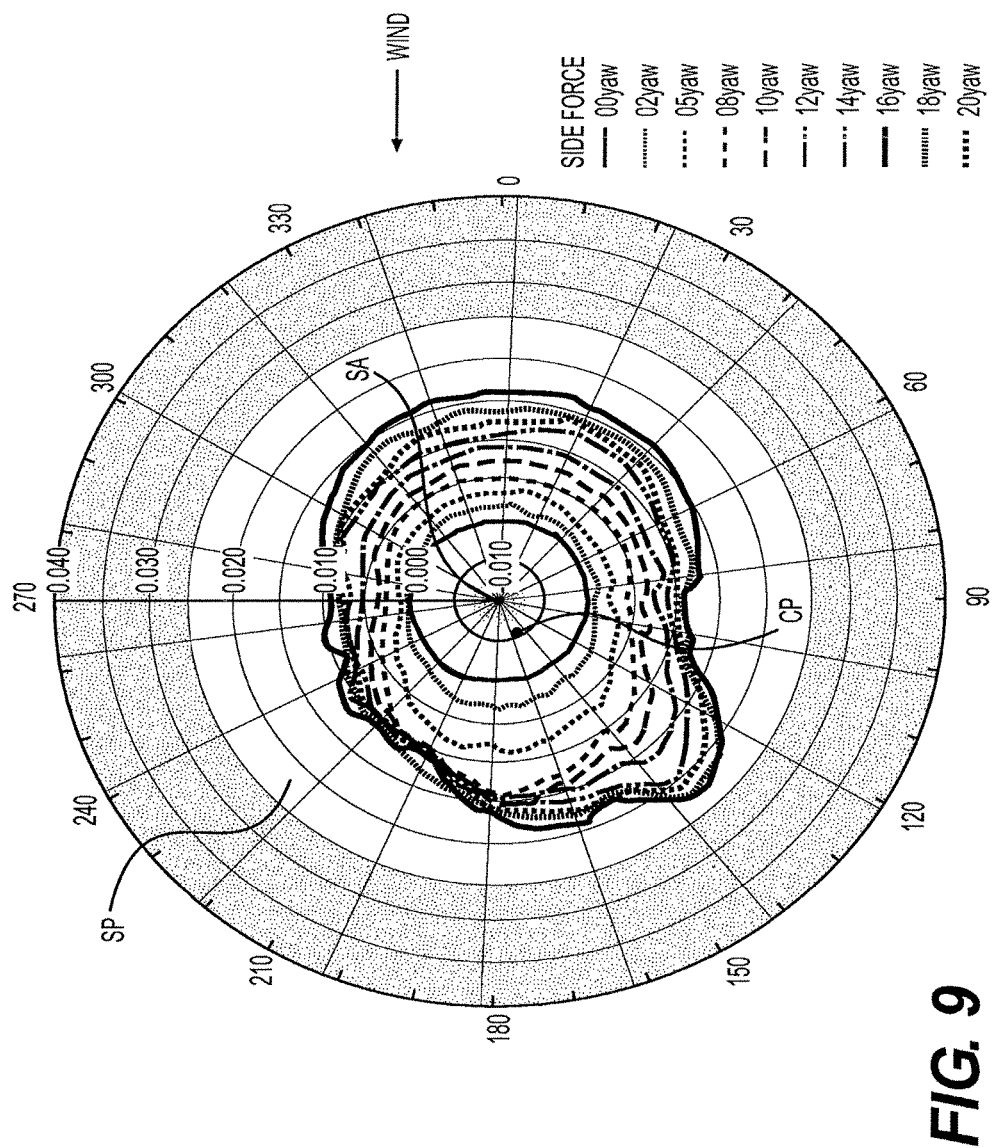
FIG. 9 is a CFD force diagram of a rim having a height of 81 mm.

The maximum width W of the toroidal rims 12, 48 is disposed closer to the spoke-engaging portions 36, 52 than the tire-engaging portions 34, 50. In FIGS. 3 and 4, the maximum width W is disposed 22 mm from the end of the rim. FIG. 7 shows an alternative rim 70 having a toroidal shape with an aspect ratio of 1.8 (W=31.75 mm, H=57.22) and the maximum width W is disposed closer to a spoke-engaging portion 72 than a tire-engaging portion 74 of the rim 70. FIGS. 8 and 9 are Computational Fluid Dynamic (CFD) force diagrams showing side forces on rims having heights of 58 mm and 81 mm, respectively. In the rims of FIGS. 8 and 9, the center of pressures CP induced by crosswinds are disposed behind and below the steering axis SA of the wheel (and by extension, the rim), or the axis of hub 16. The rearward center of pressure makes the wheel want to steer into the wind and the low center of pressure reduces the leverage of the wind on the bicycle lean angle, each of the rearward and lower centers of pressure contributing to an inherently more stable wheel and improving aerodynamic efficiency.

The toroidal rims 14, 48 are made of a composite material. Further, the interior of the rims may be solid, hollow, filled or reinforced as desired to obtain the desired strength, weight and cost.

While this invention has been described by reference to several embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed:

1. A rim for a bicycle wheel having a tire, hub and spokes, the bicycle rim comprising:
    a radially outer tire-engaging portion;
    a radially inner spoke-engaging portion;
    a first sidewall;
    a second sidewall spaced apart from the first sidewall, the first and second sidewalls extending between the tire-engaging and spoke-engaging portions; and
    a spoke opening for receiving the spoke therethrough,
    the tire-engaging and spoke-engaging portions and first and second sidewalls forming a toroid, wherein a transverse cross section formed by the rim and the tire mounted thereto is substantially elliptical in shape with the tire engaging portion and the spoke opening of the spoke-engaging portion in opposing ends of the elliptical shape,
    a maximum width of the rim portion of the substantially elliptical cross section is located in the first and second sidewalls and is disposed closer to the spoke-engaging portion than the tire-engaging portion,
    the spoke opening disposed radially inwardly of the maximum width of the rim, and
    wherein a ratio of the maximum height of the rim to the maximum width of the rim ranges from 1.5 to 5, and the rim and tire include a side profile, the rim includes a steering axis and the transverse cross section positions the center of pressure on the side profile one of below and rearward of the rim steering axis.

2. The rim of claim 1, wherein a maximum height of the rim is greater than 40 mm.

3. The rim of claim 1, wherein a maximum height of the rim is greater than 7% of a diameter of the rim.

4. A rim for a bicycle wheel having a tire, hub and spokes, the bicycle rim comprising:
    a radially outer tire-engaging portion;
    a radially inner spoke-engaging portion;
    a first sidewall;
    a second sidewall spaced apart from the first sidewall, the first and second sidewalls extending between the tire engaging and spoke-engaging portions; and
    a spoke opening for receiving the spoke therethrough,
    the tire-engaging and spoke-engaging portions and first and second sidewalls forming a toroid, wherein a transverse cross section formed by the rim and the tire mounted thereto is substantially elliptical in shape with the tire engaging portion and the spoke opening of the spoke-engaging portion in opposing ends of the elliptical shape,
    wherein a maximum width of the rim portion of the substantially elliptical cross section is located in the first and second sidewalls and is disposed between the spoke-engaging portion and the tire-engaging portion, the spoke opening disposed radially inwardly of the maximum width of the rim, and
    wherein a ratio of the maximum height of the rim to the maximum width of the rim ranges from 1.5 to 5, and wherein the rim and tire include a side profile, the rim includes a steering axis and the transverse cross section positions the center of pressure on the side profile one of below and rearward of the rim steering axis.

5. The rim of claim 4, wherein a height of the rim is greater than 40 mm.

6. The rim of claim 4, wherein a maximum height of the rim is greater than 7% of a diameter of the rim.

7. A bicycle wheel comprising:
    a tire;
    a hub; and
    a rim comprising:
        a radially outer portion,
        a radially inner portion,
        a first sidewall,
        a second sidewall spaced apart from the first sidewall, the first and second sidewalls extending between the radially outer and the radially inner portions, and
        a spoke opening for receiving the spoke therethrough,
    the radially outer and the radially inner portions and first and second sidewalls forming a toroid, wherein a transverse cross section formed by the rim and the tire mounted thereto have a cross section that is substantially elliptical in shape with the tire engaging portion and the spoke opening of the spoke-engaging portion in opposing ends of the elliptical shape,
    the spoke opening disposed radially inwardly of a maximum width of the rim, and
    wherein a ratio of the maximum height of the rim to the maximum width of the rim ranges from 1.5 to 5, and wherein the rim and tire include a side profile, the rim includes a steering axis and the transverse cross section positions the center of pressure on the side profile one of below and rearward of the rim steering axis.

8. The rim of claim 7, wherein the radially outer portion is a tire-receiving portion and the radially inner portion is a spoke-receiving portion.

9. The rim of claim 7, wherein the radially outer portion includes a tire-securing portion and the radially inner portion includes a spoke-securing portion.

10. The rim of claim 7, wherein the radially outer portion is the radially outermost portion of the rim and the radially inner portion is the radially innermost portion of the rim.

\* \* \* \* \*